(12) United States Patent  
Baek

(10) Patent No.: US 7,494,104 B2
(45) Date of Patent: Feb. 24, 2009

(54) STAND OF DISPLAY DEVICE

(75) Inventor: Jin Uk Baek, Daegu-si (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 11/396,531

(22) Filed: Apr. 4, 2006

(65) Prior Publication Data

US 2007/0029457 A1 Feb. 8, 2007

(30) Foreign Application Priority Data

Aug. 4, 2005 (KR) ...................... 10-2005-0071466

(51) Int. Cl.
*A47G 29/00* (2006.01)
(52) U.S. Cl. .................. 248/372.1; 248/284.1; 248/917; 361/681
(58) Field of Classification Search ............. 248/372.1, 248/371, 284.1, 133, 917, 919, 922; 361/681
See application file for complete search history.

(56) References Cited

U.S. PATENT DOCUMENTS

| 6,672,553 | B1 * | 1/2004 | Lin .......................... 248/276.1 |
| 6,822,857 | B2 | 11/2004 | Jung et al. ................... 361/681 |
| 7,198,237 | B2 * | 4/2007 | Cho et al. ................... 248/133 |
| 2003/0122046 | A1 | 7/2003 | Huong ..................... 248/291.1 |
| 2005/0006537 | A1 * | 1/2005 | Jung et al. .................. 248/133 |
| 2005/0051692 | A1 | 3/2005 | Jung et al. .................. 248/371 |
| 2006/0032998 | A1 * | 2/2006 | Depay ..................... 248/291.1 |
| 2007/0047186 | A1 * | 3/2007 | Jang ........................... 361/681 |

FOREIGN PATENT DOCUMENTS

| EP | 1 312 851 B1 | 5/2003 |
| EP | 1 505 333 A2 | 2/2005 |
| KR | 10-2005-0107285 A | 11/2005 |

OTHER PUBLICATIONS

European Search Report dated Jun. 1, 2007.
Korean Office Action dated Jul. 25, 2006.

* cited by examiner

*Primary Examiner*—Anita M King
(74) *Attorney, Agent, or Firm*—Ked & Associates LLP

(57) ABSTRACT

Provided is a stand of a display device which can be used both as a wall-mounted type and a desk-type for improving an operational reliability and a convenience of users, comprising: a display device; a supporting portion supporting a rear surface of the display device; a base placing the display device at a different position; a main link portion connected between the supporting portion and the base by a hinge so that the supporting portion can be rotated with respect to the base; an auxiliary link portion connected between the supporting portion and the base by a hinge at a side of the main link portion for maintaining an angle of a display device when the main link portion is rotated; an elastic member of which both ends being connected at the auxiliary link portion and the main link portion, respectively, for controlling vertical movements of the display device; and a stopping portion for fixing a folding state when the main link portion is folded.

23 Claims, 6 Drawing Sheets

STAND OF DISPLAY DEVICE

BACKGROUND OF THE INVENTION

1. Field of the Invention

The present invention relates to a stand of a display device, and particularly, to stands capable of operating both as a desk-type stand and a wall-mounted type stand. More particularly, the present invention relates to a stand of a visual display device, since the stand is changed into a desk-type and a wall-mounted type in accordance with its operational state, it is possible to prevent an operational capacity of the stand from being decreased when tensions and restorations of the springs are repeatedly performed, conveniently perform the operations of the wall-mounted stand and maintain a fixed state of the folded stand to be reliable.

2. Description of the Related Art

In general, a stand comprises a supporting portion locating at a rear surface of a main body of a display device on which an image is displayed, a base portion locating at the supporting portion such as a bottom or a wall and a link portion connecting the base portion and the supporting portion.

At this time, the lower portion of the link portion is supported to be vertically rotated at a pair of fixed brackets connected to a base portion. The supporting portion is connected to a rear surface of a main body of the display device by a hinge for the main body of the display device to be tilted.

Recently, an auxiliary link is installed at a side of the link portion in order to retain the link portion to be rotated. In general, the auxiliary link is formed to have two links in parallel, and a spring is between the two links.

To describe operations of the spring, the spring maintains its original state while the stand sets with respect to a vertical face. In addition, the spring is tensioned if the stand is folded, and the spring continues to maintain its tension. If the stand is fixed to be folded, the spring continues to maintain its tension. If the stand is unfolded, an auxiliary link is pulled by a restoring force of the spring, therefore the stand rapidly returns to a state of setting with respect to a vertical surface.

The spring formed on the auxiliary link portion is connected between a link member and a link member. Therefore, if the stand is folded, both ends of a tension spring are configured to be extended.

If the folded state of the stand continues for a long time at a state that the both ends of the tension spring is extended when the stand is folded, the tension spring exceeds an elastic limit and continues the extended state. Accordingly, an elastic force of the tension spring may be degraded. Therefore, when the stand is used as a desk-type, the stand does not appropriately apply a restoring force at the state that a tension spring is plastic-deformed, resulting in inconvenience of movements of the stand. This problem may occur even when the stand is used as a desk-type stand and a weight is applied to a tension spring, because a user often adjusts a height of the stand.

In addition, the stand includes a fixing device for fixing a folding of the stand. The fixing device is equipped in an inner portion of a base portion of the stand. Therefore, if the stand is folded, the fixing device is engaged with a connecting portion formed at an end of the link portion and the folding state of the link portion is fixed. In order to disassemble the fixing device, a user pulls a disassemble lever at a lower portion of the stand to disassemble a fixing device coupled with a connecting portion of the link portion.

However, the conventional fixing devices are additionally formed at a base of a stand, and the costs for manufacturing required for configuring the base portion are increased.

In addition, in order to disassemble the folded state of the stand, additional operations such as pulling a disassembling device lever are required, and this may cause an inconvenience of users.

SUMMARY OF THE INVENTION

It is an object of the present invention to provide with a stand capable of preventing a capability of tension springs from being degraded in an auxiliary link even when an over-weight is repeatedly applied to a spring such as a case that the folding of a stand continues for a long time.

In addition, it is another object to provide with a stand to which a main link is automatically fixed without installing additional fixing device to the base portion in order to fix the main link of the stand, if the stand is folded.

Furthermore, it is another object to provide a stand with a high product reliability to improve the convenience of a user with a simple configuration.

In accordance with an object of the present invention, a stand of a display device comprises: a display device; a supporting portion supporting a rear surface of the display device; a base placing the display device at a different position; a main link portion connected between the supporting portion and the base by a hinge so that the supporting portion can be rotated with respect to the base; an auxiliary link portion connected between the supporting portion and the base by a hinge at a side of the main link portion for maintaining an angle of a display device when the main link portion is rotated; an elastic member of which both ends being connected at the auxiliary link portion and the main link portion, respectively, for controlling vertical movements of the display device; and a stopping portion for fixing a folding state when the main link portion is folded.

In another aspect of the present invention, a stand of display device comprises: a display device; a supporting portion supporting a rear surface of the display device; a base on which the display device is placed; a main link portion connected to the supporting portion and the base by a hinge, respectively such that the supporting portion rotates with respect to the base; an auxiliary link portion connected to the supporting portion and the base by a hinge for adjusting a rotating angle of the main link portion; a first elastic member providing with an elastic force in a rotational direction of the main link portion; and a stopping portion fixing a folding state at the time of folding of the main link portion; and wherein the stopping member comprises: a first member fixedly mounted to a common hinge shaft of the main link and the base; a second member freely moving in an axial direction of the common hinge shaft; a second elastic member providing with a pushing force in a direction of the first member with respect to the second member; and a pair of corresponding prominence and depression portions provided at a predetermined location of a contact surface of the first member and the second member to be engaged each other for refraining a rotation of the main link.

In another aspect of the present invention, a stand of display device comprises: a display device; a supporting portion supporting a rear surface of the display device; a base on which the display device is placed; a main link portion connected to the supporting portion and the base by a hinge, respectively such that the supporting portion rotates with respect to the base; an auxiliary link portion connected to the supporting portion and the base by a hinge for adjusting a rotating angle of the main link portion; and an elastic member of which both ends being connected at the auxiliary link portion and the main link portion, respectively, for controlling vertical movements of the display device.

It is possible to prevent a possibility of a tension spring from being degraded even when the folding of a stand lasts for a long period by the folding due to a configuration of the present invention. In addition, if the stand is folded, a main spring of the stand can be fixed itself to simplify the structure of the stand and the stand can be folded and disassembled conveniently.

In addition, a stand can be conveniently used by the configuration suggested as above and the operational reliability of the stand is improved when the user operates the stand.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
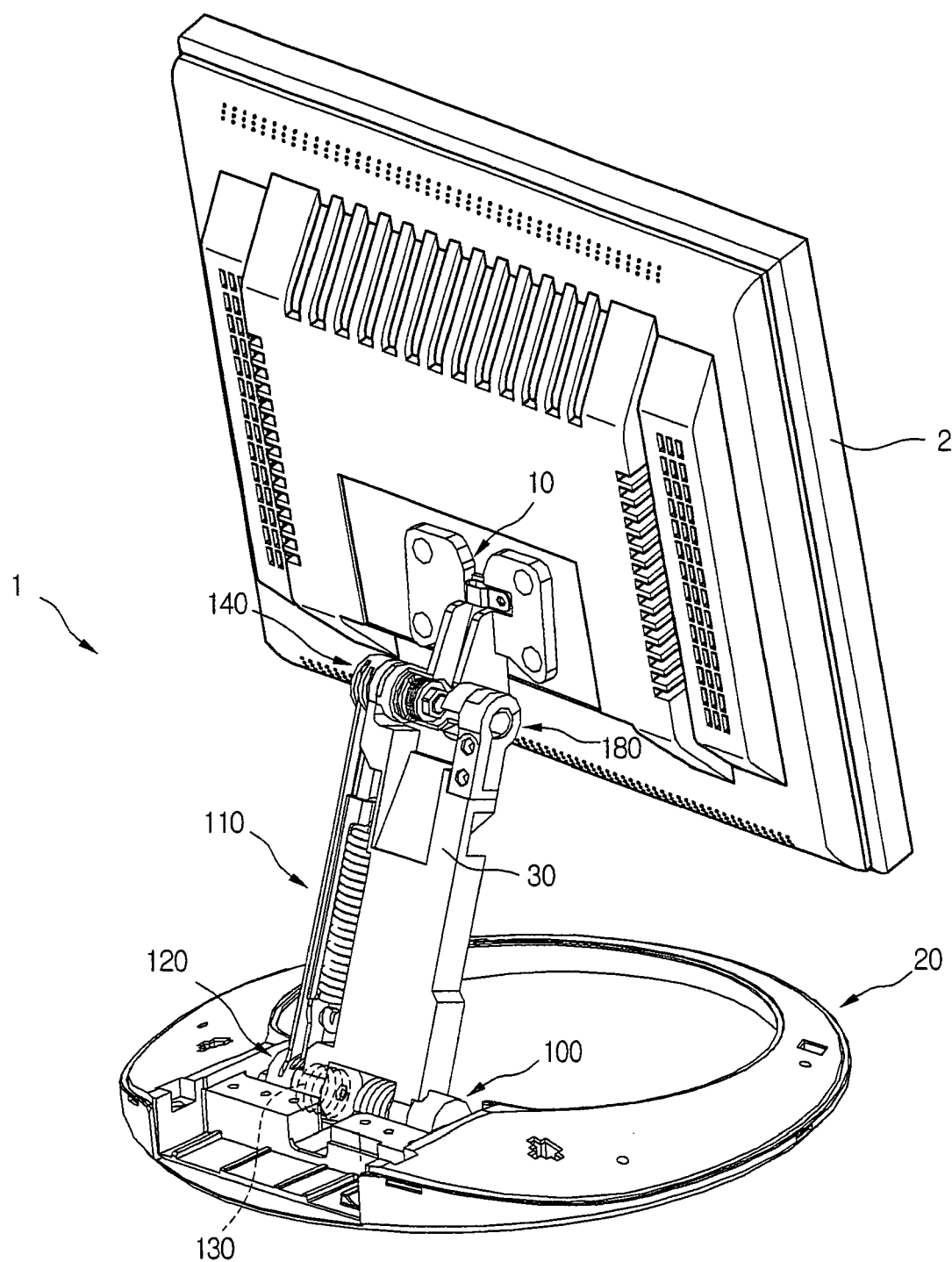
FIG. 1 is a perspective view of a stand of a display device in accordance with the present invention.

FIG. 1 is a rear surface perspective view of a display device in accordance with the present invention.

Referring to FIG. 1, the stand 1 comprises: a supporting portion 10 fixed at a rear surface of a visual display device 2 such as an LCD monitor to support the visual display device 2, a base portion 20 for mounting the visual display device 2 at a bottom surface and a main link 30 of which both ends are rotatively connected to the supporting portion 10 and the base portion 20. In addition, an auxiliary link portion 110 connected between the supporting portion 10 and the base portion 20 is positioned at a side of the main link 30, or a left side with reference to FIG. 1. A folding stopper 130 equipped with the base portion 20 is provided at a bottom surface of the auxiliary link portion 110 so as to fix the folding state of the main link 30.

More particularly, the supporting portion 10 is rotatively connected to the main link 30 by the first link hinge portion 180 and the second hinge portion 140. In addition, the main link 30 is rotatively connected to the base portion 20 by the first base hinge portion 100 and the second base hinge portion 120.

In addition, both ends of the auxiliary link portion 110 are equipped to be connected with the second link hinge portion 140 and the first auxiliary link hinge portion located in the second base hinge portion 120. A spring of which one end is connected to the main link 30 and the other end is connected to a side surface of the auxiliary link is provided in the auxiliary link portion 110.

Furthermore, a folding stopper 130 is equipped in the second base hinge portion 120 for maintaining a folding state of the main link 30 when the main link 30 is folded. A detailed configuration and operation of the folding stopper 130 will be described.

The brief operations of the stand of the display device will be described.

The main link 30 is operated as a tool supporting a weight of the display device 20 and performs a function for supporting the weight. In addition, the auxiliary link portion 110 is operated as a quadric link such that the second base hinge portion 120 and the second link hinge portion 140 are maintained in parallel. Therefore, the display device 20 maintains a uniform angle even though a user lowers the display device 20, and it is advantageous that a user can see the display device 20 with the same angle due to the above operational features.

Meanwhile, a spring (refer to 118 of FIG. 2) of which both ends are positioned at the auxiliary link portion 110 and the main link 30 is provided, and a rotation force rotated in one direction is applied to the auxiliary link portion 110 configuring a quadric link by the spring 118, for example, a force moving the display device 20 upwardly. Therefore, a user can move the display device 20 conveniently with the same force upwardly or downwardly.

In addition, when a user uses a stand as a wall-mounting type, the main link 30 is completely folded because the folding stopper 130 functions as the main link 30. Therefore, it is advantageous that when the main link 30 and the auxiliary link 110 are folded without additionally fixing the main link 30, the folding state is maintained.

Figure 2:
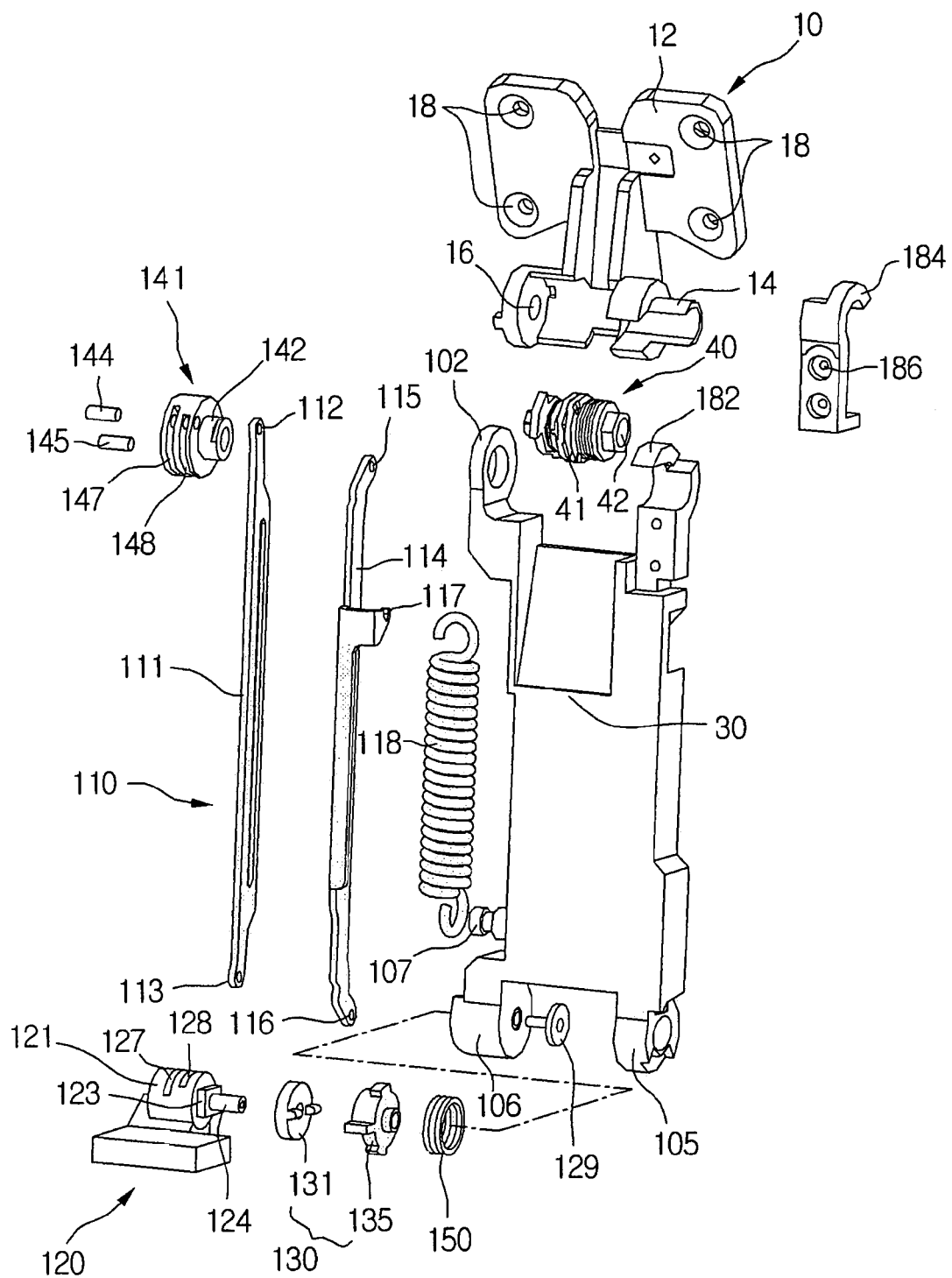
FIG. 2 is a disassembled perspective view of a main link portion and an auxiliary portion of the stand in accordance with the present invention.

FIG. 2 is a perspective view where the configurations of a supporting portion 10, a main link 30 and an auxiliary link portion 110 are disassembled in a stand structure of a display device in accordance with the present invention.

Referring to FIG. 2, the supporting portion 10 includes a display device supporting part 12 fixed at a rear surface of the display device 2. A plurality of display device coupling holes are formed at the display device supporting part 12, and coupling members such as a screw are connected in the display device coupling hole 18, thereby the display device supporting part 12 is connected with a rear surface of the display device 2.

The first hinge shaft 14 configuring the first link hinge shaft 180 with respect to the main link 30 is formed, and the second hinge hole 16 to which the second link hinge shaft 42 configuring the second link hinge portion 140 is inserted is formed at a lower portion of the supporting part 12.

The first hinge shaft 14 is mounted at the first hinge receiving portion 182 of the main link 30 with a common center. The first hinge coupling member 184 is connected in the first hinge receiving portion 182 through hole 186, thereby fixing the display device supporting part 12 rotatively at a position with respect to the main link 30. In other words, the display device connected with the display device supporting part 12 can be additionally rotated with respect to the main link 30.

The second hinge spring member 40 is equipped in the inner portion of the second hinge hole 16. The second hinge spring 41 for tilting the supporting portion 10 and the second hinge shaft 42 configuring a hinge shaft of the second link hinge portion 140 are included in the second hinge spring member 40.

An end of the second hinge shaft 42 penetrates the second hinge shaft receiving portion 102 formed at an upper end of the main link 30 to be connected with the second link supporting shaft 142 extended from an inner portion of the second auxiliary link supporting portion 141.

The second auxiliary link receiving portions 147 and 148 for receiving the ends of the two auxiliary links 111 and 114 equipped at a side of the main link 30 are formed in the second auxiliary link supporting portion 141. Preferably, the two auxiliary links 111 and 114 are in parallel.

Meanwhile, a rotational center of the two auxiliary links 111 and 114 is moved from the rotational center of the main link 30 in parallel at a predetermined interval. In other words, the auxiliary links 111 and 114 are connected with the second auxiliary link supporting portion 141 by a hinge at the opposite points with respect to the rotational center of the main link 30. The auxiliary links 111 and 114 perform roles as two links providing with a quadric link due to the above relation. In order to obtain the above, an end of the two auxiliary links 111 and 114 is rotatively fixed to the second auxiliary link supporting portion 141 by the second auxiliary link fixing shafts 144 and 145 inserted into penetrating holes 112 and 115.

In addition, the penetrating holes 113 and 116 are formed at the other end of the two auxiliary links 111 and 114. The auxiliary links 111 and 114 are connected to the first auxiliary link supporting portion 121 through the penetrating holes 113 and 116 by a hinge. In addition, the first base hinge receiving portion 105 and the second base hinge receiving portion 106 for rotatively connecting the main link to the base portion 20 are formed at a lower portion of the main link 30.

Furthermore, the first auxiliary link receiving holes 127 and 128 for receiving the two auxiliary links 111 and 114 are formed in the first auxiliary link supporting portion 121. The other end of the two auxiliary links 111 and 114 is rotatively fixed in the first auxiliary link receiving portions 127 and 128 by the first auxiliary link fixing shafts 125 and 126.

In addition, the second base hinge portion 120 for fixing the main link 30 to the base portion 20 by a hinge is positioned in an inner portion of the first auxiliary link receiving portions 127 and 128. A folding stopper 130 for stopping rotations of the main link 30 is formed in the second base hinge portion 120 when the main link 30 is folded. The folding stopper 130 will be described in detail.

Meanwhile, a main spring 118 is equipped in an inner portion of the first auxiliary link 114 close to main link 30 of the two auxiliary links 111 and 114. An end of the main spring 118 is engaged on the second main spring protrusion 117 formed in the inner upper portion of the first auxiliary link 114, and the other end of the main spring 118 is engaged on the first main spring protrusion 107 formed at a lower side face of the main link 30.

As described above, both ends of the main spring 118 are connected with the first auxiliary link 114 and the main link 30, respectively to apply a pulling force. However, a length of the main spring 118 is increased gradually when the main link 30 is folded, and a length of the main spring 118 is decreased gradually when the main link 30 is unfolded. Finally, the main link 30 is always applied by a force in a direction of unfolding the main link 30 in the main spring 118.

Figure 3:
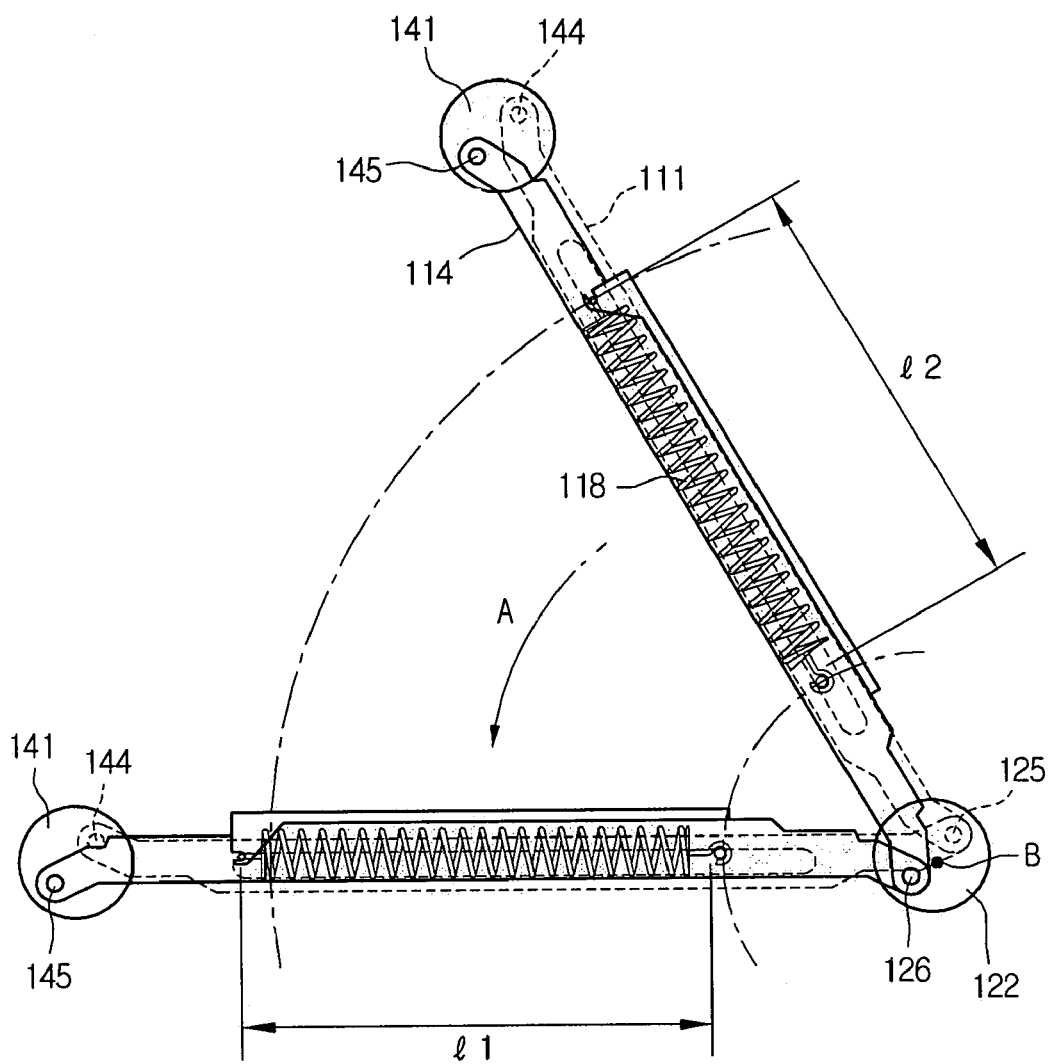
FIG. 3 is a side view showing operations of a main spring of the stand in accordance with the present invention.

FIG. 3 is a view of a stand according to the present invention illustrating a main spring 118 interposed between the auxiliary link portion 110 and the main link 30 while moving from the position where the main link stands to the folded position. The operations of the main spring 118 in a stand according to the present invention will be described with reference to FIG. 3.

Referring to FIG. 3, the main spring 118 maintains its original shrinked state while the stand stands. The main spring 118 has the minimum length ι 2 and has the minimum elastic force at the minimum length.

If a user rotates the main link 30 in a direction of an arrow A in order to fold the stand, two auxiliary links 111 and 114 are rotated in accordance with the rotation of the main link 30.

At this time, even if the two auxiliary links 111 and 114 rotate around the center of the second base fixed bracket 122 fixed to the base portion 20, the two auxiliary links 111 and 114 do not change their lengths but relative positions. However, since the auxiliary links 111 and 114 have different rotation centers with respect to the main link 30, the auxiliary links 111 and 114 change their relative positions.

For more description of the operations of the main link and the auxiliary link under the circumstances, since an end of the main spring 118 fixed at a side of the main link 30 has a regular distance from the rotation center B when the main link 30 rotates but the two auxiliary links have eccentric rotation centers with respect to the main link 30, the other end of a spring fixed at a side of the first auxiliary link 114, in other words, the point of the second main spring protrusion 117 becomes more distant from the rotation center B of the main link 30.

Accordingly, the main spring 118 is extended and the extended main spring 118 has an elastic force, and the elastic force of the main spring 118 is operated as a force suppressing a folding rotation of the main link 30. Continuously, when the main link 30 is completely folded, in other words, reaches to a position perpendicular to the bottom surface of the main link 30, the length of the main link 30 becomes the maximum ι 2 and has the maximum elastic force at the minimum length.

As described above, an end of the main spring 118 is connected to the main link 30, and the other end of the main spring 118 is connected with the auxiliary link 144. Therefore, the end of the main spring 118 does not change its position even if the main link 30 is rotated, and the other end of the main link 118 is lengthen if the main link 30 is folded. In accordance with the above scope of the present invention, the tension length of the main spring 118 is decreased in comparison with the state that both ends of the main spring 118 are connected with the auxiliary link when the stand is folded. A reliability of a spring is improved if the tension length of the main spring is decreased. In addition, unlike the conventional art, no complex tools are required so as to install a main spring 118 at a narrow interval between the auxiliary links 114, therefore, an assembling task is conveniently possible with simple tools at a workplace.

The main link 30 is automatically fixed by a folding stopper 130 in accordance with the present invention at the state that the main link 30 is folded, in other words, in a wall-mounted type, and the main link maintains the folded state. The operations that the main link 30 is fixed to the folding stopper 130 will be described.

Furthermore, if the main link 30 is unfolded, in other words, if the stand becomes a stand type, the main link 30 returns to a standing position by the elastic force, and a user can easily restore the position of the main link 30 by applying with a slight force.

The main spring 118 of a stand according to the present invention is extended or decreased only at a specific side, or an auxiliary link. Accordingly, the main spring in accordance with the present invention decreases its extended length even if it is positioned at the same place in comparison with a conventional spring connected between the link and the link and extended in both directions. Accordingly, a tension length of the main spring 118 is decreased when the stand is folded, and the main spring 118 exceeds an elastic limit to lessen a risk to degrade the capability, even when the stand is maintained to be folded for a long time.

Figure 4:
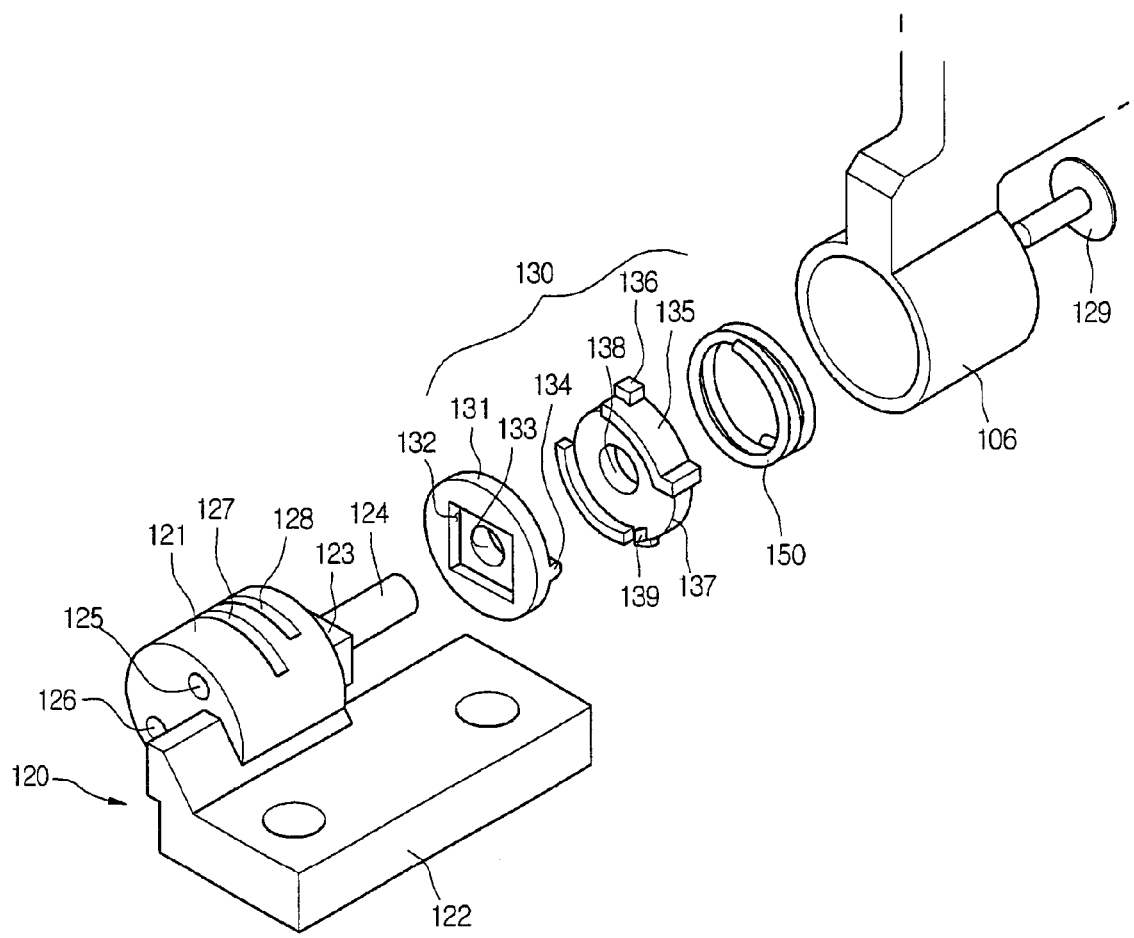
FIG. 4 is a disassembled perspective view of a folding stopper of the stand in accordance with the present invention.
Figure 5:
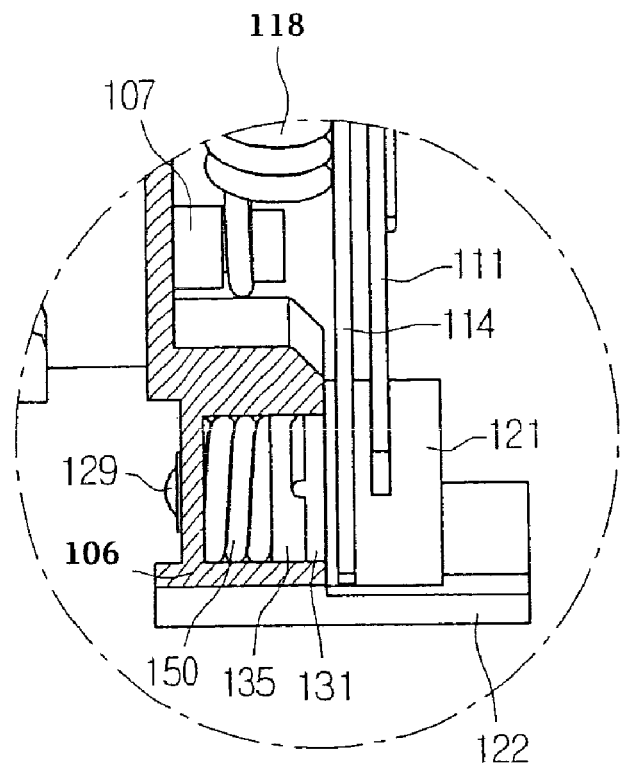
FIG. 5 is a front view showing an assembled state of the folding stopper of the stand in accordance with the present invention.

FIG. 4 is a disassembled perspective view of a folding stopper 130 according to the present invention, and FIG. 5 is a front view showing an assembled state of the folding stopper 130 in accordance with the present invention.

As described above, the folding stopper 130 according to the present invention is a configuration element for automatically fixing a position of the main link 30 when a stand is folded. The configuration of the folding stopper 130 according to the present invention will be described with reference to FIGS. 4 and 5.

Referring to FIG. 4, the folding stopper 130 according to the present invention includes a latch 131 and a rotating body 135. The latch 131 is positioned at a side of the first auxiliary link supporting portion 121 of the second base fixing bracket 122, and the rotating body 135 is inserted in the second base hinge receiving portion 106.

More particularly, the second base hinge shaft 129 penetrates the second base hinge receiving portion 106, the coil spring 150, the rotating body 135 and the latch in series from a side of the second base hinge receiving portion 106 to be inserted in the second base hinge shaft receiving hole 124. In addition, a latch fixing portion 123 to which the latch 131 is fixed and the second base hinge shaft receiving portion 124 are protruded at a side of the first auxiliary link fixing shaft. In addition, the second base hinge shaft receiving portion 124 is inserted in the latch shaft receiving portion 133 of the latch 131.

A fixing groove 132 is formed at a side of the latch 131. The fixing groove 132 is inserted in the latch fixing portion 123, and the latch 131 is not rotated but fixed with respect to the base portion 20.

A protuberance 134 is formed at the other surface of the latch 131 in the same direction as the direction that the second base hinge shaft receiving portion 124 is protruded. It is preferable that the protuberance 134 is formed at an outer surface of the latch 131.

The folding stopper 135 includes a rotating body 135 rotating along with the main link as a member corresponding to the latch 131. A rotating shaft receiving portion 138 is formed at the center of the rotating body 135. The rotating body shaft receiving portion 138 is rotatively inserted in the second base hinge shaft receiving portion 124. The rotating body 135 contacts with the latch 131 at least one point. The rotating body 135 has a protrusion 136 at an outer circumference, and the protrusion 136 is fixed in the second base hinge receiving portion 106. Accordingly, the rotating body 135 is rotated together when the main link 30 is rotated.

A radial perforated portion 137 is formed at a side of the rotating body 135 contacting with the latch 131 so that the protuberance 134 of the latch 131 can move when the rotating body 135 is rotated.

The radial perforated portion 137 is provided with a groove dug inwardly in the rotating body 135 with an extended groove shape having the same height as the protruded height of the protuberance 134 of the latch 131 in a circumferential direction.

Referring to FIG. 5, an end of the radial perforated portion 137 is formed to contact with a protuberance 134 of the latch 131 at a state that the main link 30 stands. A hitch projection 139 is formed at a side of the radial perforated portion 137.

The hitch projection 139 is operated as a stopper with respect to a protuberance 134 of a latch 131 when the rotating body 135 rotates with respect to the latch 131. This operation will be described more in detail.

Figure 6:
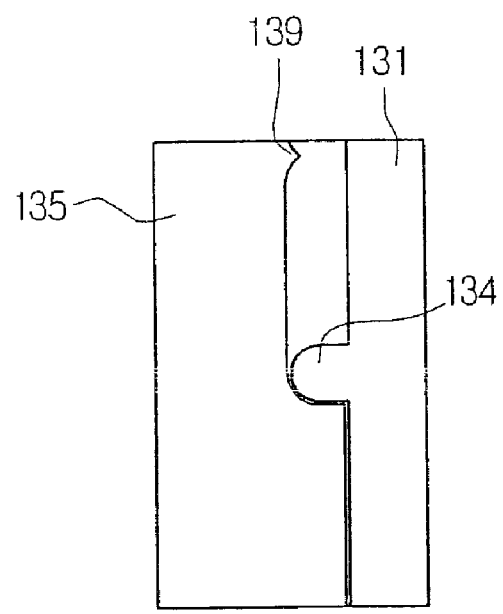
FIG. 6 is a view showing a state before the folding stopper is operated in accordance with the present invention.
Figure 7:
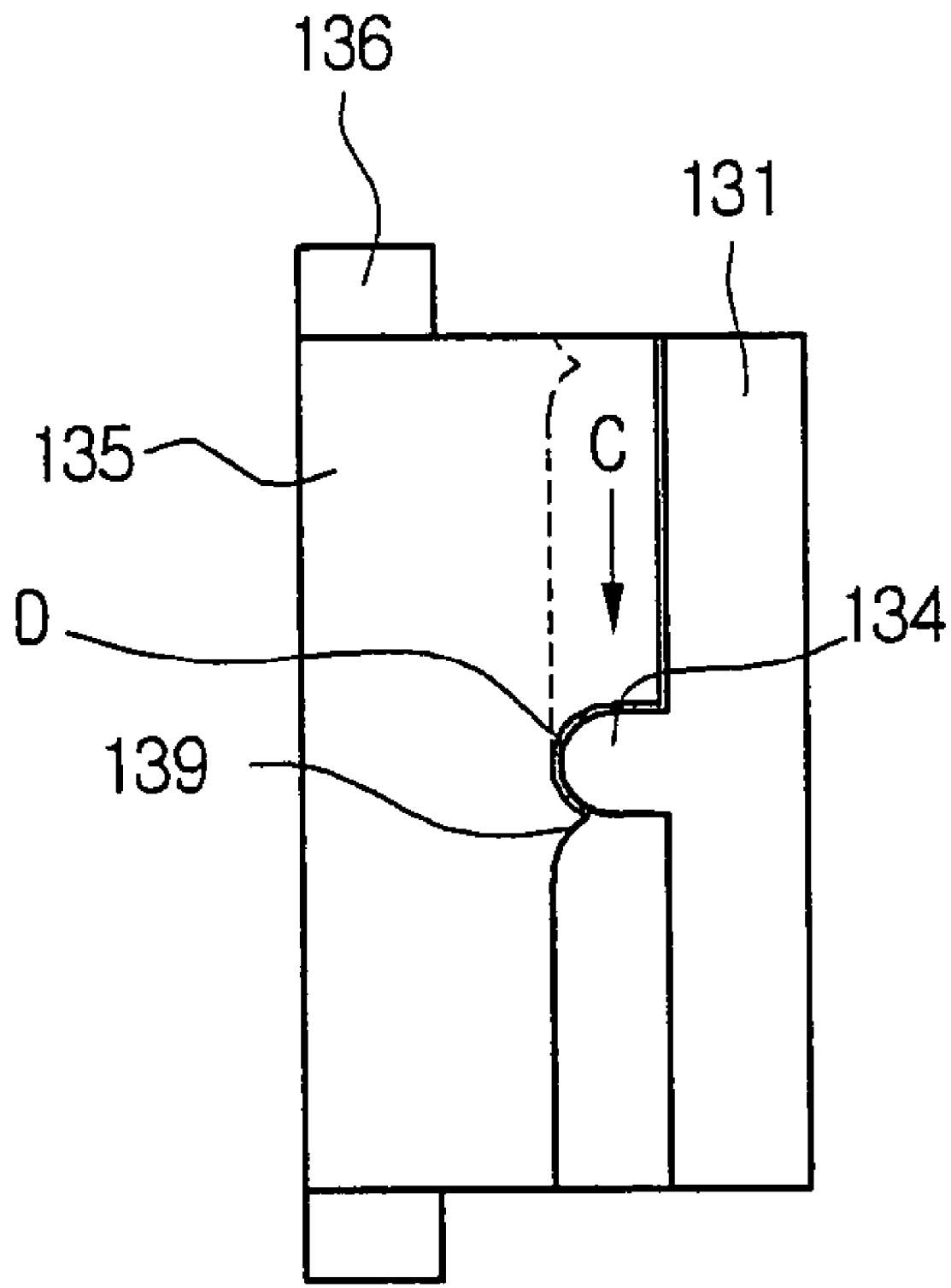
FIG. 7 is a view showing a state after the folding stopper is operated in accordance with the present invention.

FIG. 6 is a view showing a relative position of a latch 131 and a rotating body 135 of a folding stopper 130 at a state where the stand structure stands, in other words, in a desk-type stand, and FIG. 7 is a view showing a relative position of a latch 131 and a rotating body 135 of a folding stopper 130 at a state where the stand structure is folded, in other words, in a wall-mounted type stand.

Referring to FIGS. 6 and 7, a protuberance 134 of a latch 131 is contacted with an inner side of a radial perforated portion 137 of a rotating body 135 at a state that a stand stands. Next, if a stand is folded and a main link 30 is rotated, a rotating body 135 rotates in an arrow direction C along with the main link 30.

As the rotating body 135 rotates, a radial perforated portion 137 of the rotating body 135 moves passing through the protuberance 134 of the latch 131. In detail, the radial perforated portion 137 guides the protuberance 134 and the rotating body 135 is rotated, a hitch projection 139 formed at a lower side of the radial perforated portion 137 is close to the protuberance 134.

Next, the hitch projection 139 passes through the protuberance 134 and is applied with a predetermined force.

At this time, the force applied by the user is operated as a force compressing the coil screen 150, more particularly, a force provided to the hitch projection 139 pushes the rotating body 135 in a direction, or a left direction with reference to FIG. 6, while the protuberance 134 passes the hitch projection 139, and a force pushing the rotating body 135 is operated as a force contracting the coil spring 150. Of course, the coil spring 150 returns to its original state when the protuberance 134 completely crosses the hitch projection 139.

If a more force than required is applied so that the protuberance crosses the hitch projection, the main link 30 is completely folded. At this time, as shown in FIG. 7, if the protuberance 134 formed on the latch 131 crosses the hitch projection 139 of the rotating body 135, it is mounted at a mount groove D formed at an end of a radial perforated portion 137 of the rotating body 135. It is preferable that a force that the hitch projection 139 supports a protuberance 134 of the latch 131 is larger than an elastic force supporting the folding of the main spring 118 established on an auxiliary link, and if an external force is not applied at the folded state, it is desirable that the folded state is not disassembled.

The main link 30 of a stand in accordance with the present invention due to the above operation is fixed to a folding stopper 130 positioned at a lower portion of the main link 30, therefore a rotation of a main link is deterred.

In other words, when the main link 30 is folded, the folding state is automatically fixed. Accordingly, the user does not use additional lock devices mounted on a base portion such as a conventional stand, and can fix a folding state of the main link by applying the main link with a predetermined force.

In the meantime, the user disassembles a folding of the main link 30 by pulling the main link 30 in an opposite direction at the time of folding with more force than a predetermined force required to fold the main link 30. This is because that the protuberance 134 of the latch 131 to which a mount groove is mounted in the radial perforated portion of the rotating body at folding, and the applied force is operated as a force shrinking the coil spring 150. In addition, after the protuberance 134 passes the hitch projection 139, the main spring 118 mounted on an auxiliary link applies an elastic force corresponding to a folding to the main link 30, therefore, the main link 30 returns to its original position where the stand stands without additional force by the user.

The stand in accordance with the present invention having the above configuration has an effect to prevent a tension spring in an auxiliary link from being degraded, even if the folding of a main link lasts for a long time.

In addition, in the stand in accordance with the present invention, a main link is automatically fixed without establishing additional fixing device to a base portion in order to fix the main link of the stand if a stand is folded. Therefore, a main link is automatically fixed to simplify the structure of the stand to provide with an effect of convenient folding and disassembling the stand.

While the present invention has been described in connection with specific and preferred embodiments thereof, it is capable of various changes and modifications without departing from the spirit and scope of the present invention. It should be appreciated that the scope of the invention is not limited to the detailed description of the invention hereinabove, which is intended merely to be illustrative, but rather comprehends the subject matter defined by the following claims.

For example, an end of the main spring is fixed to an auxiliary link, and the other end is fixed to the main link, but the present invention is not limited to this. One end is fixed to the auxiliary link and the other end is mounted to any member to which a rotation center is fixed with respect to a main link. In addition, a protrusion for fixing a main spring is suggested has been described, but it is possible to form a groove in a body of the auxiliary link to directly install it in the groove.

In another instance, a restoring force is applied when a rotating body is moved by the coil spring in the present embodiment, but a hitch projection and a protuberance are connected to be engaged by an interval of the latch and the rotating body and a position change of a product provided by a tolerance without a coil spring. Furthermore, an elastic member of a coil spring applying a force to the rotating body is not limited to the coil spring, but a torsion spring or another elastic member can be suggested. In addition, the coil spring is suggested to have a shape supporting a rotating body but may be provided with a type supporting the latch.

What is claimed is:

1. A stand of a display device comprising:
   a display device;
   a supporting portion supporting a rear surface of the display device;
   a base placing the display device at a different position;
   a main link portion connected between the supporting portion and the base by a pluraliy of hinges so that the supporting portion can be rotated with respect to the base;
   an auxiliary link portion connected between the supporting portion and the base by a plurality of hinges at a side of the main link portion for maintaining an angle of the display device when the main link portion is rotated;
   an elastic member for controlling vertical movements of the display device, one end of the elastic member being connected at the auxiliary link portion and the other end of the elastic member being connected at the main link portion; and
   a stopping portion for fixing a folding state when the main link portion is folded.

2. The stand of claim 1, wherein the auxiliary link portion is a quadric link connecting the supporting portion and the base for uniformly maintaining a tilting angle of the display device even when the display device moves in a vertical direction.

3. The stand of claim 1, wherein the elastic member applies a restoring force in a direction for disassembling the folded main link portion.

4. The stand of claim 1, wherein the auxiliary link portion includes two auxiliary links with different rotation supporting points with respect to the supporting portion and the base.

5. The stand of claim 1, wherein the base is placed on a wall when the main link portion is folded, and is placed on a table when the main link portion is unfolded.

6. The stand of claim 1, wherein the display device is a display device moving by a hinge with respect to the supporting portion.

7. The stand of claim 1, wherein the stopping portion comprises:
   a rotating body rotating along with the main link portion;
   a latch fixing the location with respect to the base; and
   a pair of prominence and depression portions provided to the rotating body and the latch, respectively to be engaged with each other at the time of folding.

8. The stand of claim 7, wherein the prominence and depression portion contacts each other with a slight inclination with respect to a rotation direction of the rotating body.

9. The stand of claim 7, wherein a coil spring for elastically supporting the rotating body or the latch when the prominence and depression portion penetrates each other.

10. The stand of claim 7, wherein the prominence and depression portion comprises:
    a hitch projection provided to the rotating body; and
    a protrusion provided to the latch.

11. The stand of claim 10, wherein an end of the hitch protection configures a cusp.

12. The stand of claim 1, wherein the plurality of hinges that connect the main link portion between the supporting portion and the base is different from the plurality of hinges that connect the auxiliary link portion between the supporting portion and the base.

13. A stand of display device comprising:
    a display device;
    a supporting portion supporting a rear surface of the display device;
    a base on which the display device is placed;
    a main link portion connected to the supporting portion and the base by a plurality of hinges, respectively such that the supporting portion rotates with respect to the base;
    an auxiliary link portion connected to the supporting portion and the base by a plurality of hinges for adjusting a rotating angle of the main link portion;
    a first elastic member providing with an elastic force in a rotational direction of the main link portion; and
    a stopping portion fixing a folding state at the time of folding of the main link portion; and
    wherein the stopping member comprises:
    a first member fixedly mounted to a common hinge shaft of the main link portion and the base;
    a second member freely moving in an axial direction of the common hinge shaft;
    a second elastic member providing with a pushing force in a direction of the first member with respect to the second member; and
    a pair of corresponding prominence and depression portions provided at a predetermined location of a contact surface of the first member and the second member to be engaged each other for refraining a rotation of the main link.

14. The stand of claim 13, wherein the first elastic member of which both ends are connected at a side of the auxiliary link portion and the main link portion controls vertical movements of the display device.

15. The stand of claim 13, wherein the prominence and depression portion is engaged when the main link is folded.

16. The stand of claim 13, wherein the prominence and the depression portion has a slight inclination so that each may be engaged.

17. The stand of claim 13, wherein the plurality of hinges that connect the main link portion to the supporting portion and the base is different from the plurality of hinges that connect the auxiliary link portion to the supporting portion and the base.

18. A stand of display device comprising:

a display device;

a supporting portion supporting a rear surface of the display device;

a base on which the display device is placed;

a main link portion connected to the supporting portion and the base by a plurality of hinges , respectively such that the supporting portion rotates with respect to the base;

an auxiliary link portion connected to the supporting portion and the base by a plurality of hinges for adjusting a rotating angle of the main link portion; and an elastic member for controlling vertical movements of the display device, one end of the elastic member being connected at the auxiliary link portion and the other end of the elastic member being connected at the main link portion.

19. The stand of claim 18, wherein the auxiliary link portion is operated as a quadric link by the auxiliary link for maintaining a tilting angle of the display device regardless of the movements of the main link.

20. The stand of claim 19, wherein an end portion of the auxiliary link is supported at an eccentric position with respect to a rotation center of the main link portion.

21. The stand of claim 18, wherein the supporting portion and the display device move by a hinge.

22. The stand of claim 18, wherein the elastic member connects at least one auxiliary link configuring the auxiliary link portion and a side of a main link portion close to the base.

23. The stand of claim 18, wherein the plurality of hinges that connect the main link portion to the supporting portion and the base is different from the plurality of hinges that connect the auxiliary link portion to the supporting portion and the base.

* * * * *